United States Patent
Ko et al.

(10) Patent No.: US 10,620,166 B1
(45) Date of Patent: *Apr. 14, 2020

(54) IN-PLANE MODULUS TESTING OF MATERIALS BY AN ULTRASONIC SAME-SIDE METHOD

(71) Applicant: Government of the United States, as Represented by the Secretary of the Air Force, Wright-Patterson AFB, OH (US)

(72) Inventors: Ray T. Ko, Dublin, OH (US); Ming-Yung Chen, Beavercreek, OH (US)

(*) Notice: Subject to any disclaimer, the term of this patent is extended or adjusted under 35 U.S.C. 154(b) by 226 days.

This patent is subject to a terminal disclaimer.

(21) Appl. No.: 15/874,037

(22) Filed: Jan. 18, 2018

Related U.S. Application Data

(60) Provisional application No. 62/449,667, filed on Jan. 24, 2017.

(51) Int. Cl.
  *G01N 29/04* (2006.01)
  *G01N 29/28* (2006.01)

(52) U.S. Cl.
  CPC .......... *G01N 29/28* (2013.01); *G01N 29/043* (2013.01)

(58) Field of Classification Search
  CPC .............................. G01N 29/28; G01N 29/043
  USPC ........................................................ 73/644
  See application file for complete search history.

(56) References Cited

U.S. PATENT DOCUMENTS

| | | | | | |
|---|---|---|---|---|---|
| 3,477,278 | A | * | 11/1969 | Lynnworth | G10K 15/00 73/64.53 |
| 4,559,827 | A | * | 12/1985 | Kupperman | G01N 29/28 73/644 |
| 4,868,357 | A | * | 9/1989 | Serikawa | H05B 6/6411 219/706 |
| 5,406,851 | A | * | 4/1995 | Li | G01N 29/2487 73/644 |
| 5,494,038 | A | * | 2/1996 | Wang | A61B 8/0866 600/459 |

(Continued)

OTHER PUBLICATIONS

Chen, M., Rapid Development and Insertion of Hypersonic Materials, Jan. 26, 2012.

(Continued)

*Primary Examiner* — Jacques M Saint Surin
(74) *Attorney, Agent, or Firm* — AFMCLO/JAZ; Timothy Barlow

(57) ABSTRACT

An apparatus for performing nondestructive evaluation of a specimen comprises a first ultrasonic shear wave transducer configured to be coupled to a first side of a specimen to be tested; a second ultrasonic shear wave transducer configured to be coupled to the first side of the specimen at a predetermined distance from the first ultrasonic shear wave transducer. The first ultrasonic shear wave transducer is configured to transmit a guided wave into the specimen, and the second ultrasonic shear wave transducer is configured to receive the guided wave from the first ultrasonic shear wave transducer. The first ultrasonic shear wave transducer and the second ultrasonic shear wave transducer are low frequency shear transducers that are capable of operating at or below 0.5 MHz (500 kHz). The specimen has a planar surface or a curved surface, and a membrane may be used as the couplant between the specimen and the transducers.

11 Claims, 11 Drawing Sheets

(56) References Cited

U.S. PATENT DOCUMENTS

| | | | | |
|---|---|---|---|---|
| 5,663,502 | A * | 9/1997 | Nagashima | G01B 17/025 702/171 |
| 5,691,476 | A * | 11/1997 | Madaras | A61B 8/4281 73/625 |
| 2003/0221489 | A1* | 12/2003 | Koo | G01H 5/00 73/597 |
| 2007/0144263 | A1* | 6/2007 | Fei | G01N 29/043 73/644 |
| 2009/0217763 | A1* | 9/2009 | Yamano | G01N 29/043 73/622 |
| 2013/0030727 | A1* | 1/2013 | Zalameda | G01N 29/045 702/56 |
| 2015/0053013 | A1* | 2/2015 | Baarstad | G01N 29/26 73/620 |
| 2015/0059479 | A1* | 3/2015 | Davis | G01N 29/28 73/644 |

OTHER PUBLICATIONS

Frangopol, D., Life-Cycle Reliability-Based Optimization of Civil and Aerospace Structures, Computeres and Structures, 81, 2003, 397-410. Feb. 2003.

Greenhalgh, E.,The Assessment of Novel materials and Processes for the Impact Tolerant Design of Stiffened Composite Aerospace Structures, Composites: part A, 34, 2003,151-161.

Standard Practice for Measuring Ultrasonic Velocity in Materials, E494-15, Dec. 2015, 1-14.

Ko, R., Ultrasonic Measurements of Vlocity for Modulus Assessment of a Material Using a Delay Line Approach, 39th Annual Review of Progress in Quantitative Nondestructive Eval Jan. 2013.

Hoppe, W., Navy High-Strength Steel Corrosion-Fatigue Modeling Program, Oct. 2006.

Boehnlein, T., Research on Advanced Nondestructive Evaluation (NDE) Methods for Aerospace Structures, Mar. 2004.

* cited by examiner

IN-PLANE MODULUS TESTING OF MATERIALS BY AN ULTRASONIC SAME-SIDE METHOD

Pursuant to 37 C.F.R. § 1.78(a)(4), this application claims the benefit of and priority to prior filed Provisional Application Ser. No. 62/449,667, filed 24 Jan. 2017, which is expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

The present invention relates generally to non-destructive evaluation of materials and, more particularly, to ultrasonic testing methods.

BACKGROUND OF THE INVENTION

Known in-plane modulus tests are typically conducted by a mechanical test through a tensile test machine which results in the destruction of the specimen. The specimen tested by such mechanical means is no longer reusable for further material processing. The difficulty in controlling couplant contamination on specimens and the lack of a practical dry contact ultrasonic technique limits the usefulness of known nondestructive tests of specimens, e.g. composites. Currently, most in-plane modulus testing of composites is conducted mechanically with a tensile test machine. To prepare for a mechanical test, a tensile test specimen is cut from the composite panel. Extensometers or strain gauges are installed on the specimen for a strain measurement. In addition, a stress measurement is also needed for the in-plane modulus evaluation by mechanical means. Accordingly, specimens tested by the mechanical method are no longer reusable for further material processing. In addition, the time required to perform in-plane modulus testing is relatively long.

Current state-of-the-art approaches often require immersion of the specimen into a water tank, although water immersion is not preferred and testing high-performance composites like ceramic composite materials (CMC) and metals during an ultrasonic measurement at elevated temperature. To achieve a couplant-free condition for an ultrasonic test, advanced tools such as lasers, electromagnetic acoustic transducers, and air coupled sensors have been reported, but poor sensitivity in ultrasonic signals and limitations to certain types of materials are typical drawbacks of these advanced methods. Current dry couplant materials which is available commercially does not provide sufficient sensitivity in transmitting ultrasound. No nondestructive evaluation (NDE) analysis can be performed using this material.

SUMMARY OF THE INVENTION

The present invention overcomes the foregoing problems and other shortcomings, drawbacks, and challenges of non-destructive testing of materials. While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention, an apparatus for performing nondestructive evaluation of a specimen comprises a first ultrasonic shear wave transducer configured to be coupled to a first side of a specimen to be tested; a second ultrasonic shear wave transducer configured to be coupled to the first side of the specimen at a predetermined distance from the first ultrasonic shear wave transducer, wherein the first ultrasonic shear wave transducer is configured to transmit a guided wave into the specimen, and the second ultrasonic guided wave transducer is configured to receive the shear wave from the first ultrasonic shear wave transducer.

At least three advantages have been demonstrated using this new approach: (a) this same-side approach may provide better localized modulus or density variation detection in materials than the edge-to-edge approach, (b) the approach offers the ability for field inspections with mapping capability of localized modulus/density measurements for a large structure (e.g. aeroshell), and (c) this approach enables measurement of in-plane modulus from specimens both small and large and with flat or curved shapes.

According to a further embodiment, the first ultrasonic shear wave transducer and the second ultrasonic shear wave transducer are low frequency shear transducers that are capable of operating at or below 0.5 MHz (500 kHz). This arrangement may ensure that the modulus measurement stays in the low frequency asymptote region of the lowest symmetric mode for an in-plane modulus evaluation on a thin specimen. The use of a shear wave contact method on the same side of a thin specimen may induce the lowest symmetric mode of a Lamb wave, which makes it possible to perform nondestructive evaluation of specimens.

According to another embodiment the specimen has a planar surface such that the first and second ultrasonic shear wave transducers operate in the same plane. Alternatively, the specimen has a curved surface such that the first and second ultrasonic shear wave transducers operate in different planes.

According to a further embodiment, a dry couplant may be used between the specimen and each of the ultrasonic shear wave transducers. The dry couplant comprises a membrane between the first and second ultrasonic shear wave transducers and the specimen. This dry-contact and same-side ultrasound approach is made possible through a combination of shear wave transducers. A thin membrane, which may be a nitrile rubber, vinyl, or polyester membrane, may be included between the specimen and each transducer.

Ultrasound may be passed into a specimen without any liquid or gel ultrasonic couplant. This provides an advantage over traditional ultrasonic bulk waves or guided-wave measurements which usually require ultrasonic gel or water immersion because the dry contact ultrasonic approach reduces or eliminates the risk of contaminating the materials, which may happen during immersion or with a liquid couplant. The dry couplant also makes it possible to operate the ultrasonic shear wave transducers in a low frequency range, e.g. at or below 0.5 MHz (at or below 500 kHz).

According to another embodiment of the invention, a method for performing nondestructive evaluation of a specimen comprises: coupling a first ultrasonic shear wave transducer to a first side of a specimen to be tested; coupling a second ultrasonic shear wave transducer to the first side of the specimen at a predetermined distance from the first ultrasonic shear wave transducer; transmitting a shear wave from the first ultrasonic shear wave transducer into the specimen; and receiving the shear wave by the second ultrasonic shear wave transducer.

At least three advantages have been demonstrated using this new approach: (a) this same-side approach may provide better localized modulus or density variation detection in materials than the edge-to-edge approach, (b) the approach offers the ability for field inspections with mapping capability of localized modulus/density measurements for a large structure (e.g. aeroshell), and (c) this approach enables measurement of in-plane modulus from specimens both small and large and with flat or curved shapes.

According to a further embodiment of the invention, the method for performing nondestructive evaluation of a specimen further comprises: operating the first ultrasonic shear wave transducer and the second ultrasonic shear wave transducer at or below 0.5 MHz (500 kHz). This arrangement may ensure that the modulus measurement stays in the low frequency asymptote region of the lowest symmetric mode for an in-plane modulus evaluation on a thin specimen. The use of a shear wave contact method on the same side of a thin specimen may induce the lowest symmetric mode of a Lamb wave, which makes it possible to perform nondestructive evaluation of specimens.

According to another embodiment of the invention, the method for performing nondestructive evaluation of a specimen further comprises: operating the first and second ultrasonic shear wave transducers in the same plane on the first side of the specimen. In the alternative, the method for performing nondestructive evaluation of a specimen further comprises: operating the first and second ultrasonic shear wave transducers in different planes on the first side of the specimen.

According to a further embodiment, the method for performing nondestructive evaluation of a specimen further comprises: placing a dry couplant between the first and second ultrasonic shear wave transducers and the specimen. The dry couplant may comprise a membrane between the first and second ultrasonic shear wave transducers and the specimen. This dry-contact and same-side ultrasound approach is made possible through a combination of shear wave transducers. A thin membrane, which may be a nitrile rubber, vinyl, or polyester membrane, may be included between the specimen and each transducer. Ultrasound may be passed into a specimen without any liquid or gel ultrasonic couplant. This provides an advantage over traditional ultrasonic bulk waves or guided-wave measurements which usually require ultrasonic gel or water immersion because the dry contact ultrasonic approach reduces or eliminates the risk of contaminating the materials, which may happen during immersion or with a liquid couplant. The dry couplant also makes it possible to operate the ultrasonic shear wave transducers in a low frequency range, e.g. at or below 0.5 MHz (at or below 500 kHz).

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
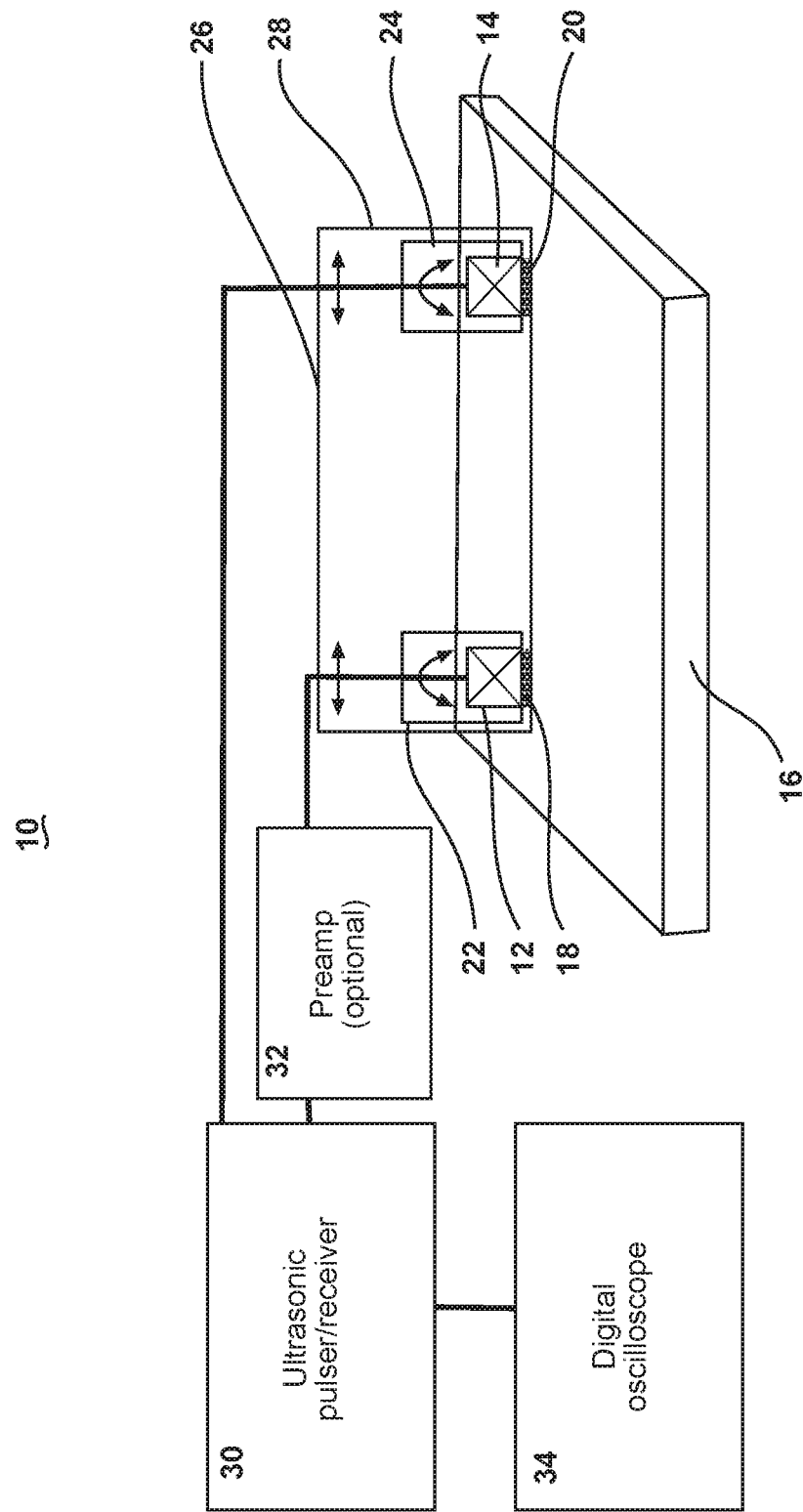
FIG. 1 depicts an apparatus for performing nondestructive evaluation of a specimen with ultrasound transducers on the same side of the specimen, according to the invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

The purpose of this invention is to provide an easy and versatile nondestructive same-side low frequency ultrasonic guided wave experimental method to monitor the in-plane modulus (Young's modulus at the in-plane direction) of a specimen, e.g. a thin composite.

In this invention, low-frequency shear wave transducers, i.e. at or below 0.5 MHz (or 500 kHz), may be placed on the same side of a specimen, e.g. a thin composite, with an adjustable skip distance between transducers. The shear wave transducers are used for the generation and reception of low-frequency ultrasonic guided waves in the specimen, which may be through a membrane instead of a liquid couplant. At least three advantages have been demonstrated using this new approach: (a) this same-side approach can provide better localized modulus or density variation detection in materials than the edge-to-edge approach, (b) the approach offers field inspection with mapping capability of localized modulus/density for a large structure (e.g. aeroshell), and (c) this approach enables the measurement of in-plane modulus from small or large specimens having flat or curved shapes.

In addition, this invention has four areas which are unique as compared to prior art: (1) it is based the lowest-order symmetric mode ultrasonic guided waves, (2) generation and detection of the guided waves is through dry contact, (3) the in-plane modulus of a material may be assessed based on the velocity of this mode, and (4) localized detection of changes in materials may be determined with ultrasonic transducers on the same side of the specimen.

Regarding the utilization of the lowest-order symmetric mode ultrasonic guided waves, the utilization of ultrasonic guided-wave in most known application is focused on higher order modes in which many different modes co-exist together. The existence of many higher-order modes together makes it difficult to monitor small changes in materials using these higher order modes. Low-frequency shear wave transducers, when they are on the same side of a specimen and their displacement/vibration direction is pointed to each other, can produce a Lamb wave of the lowest symmetric mode. The term "symmetric" means the vibration is symmetric or mirrored with respect to a specimen. The term "lowest" is utilized because there are multiple higher modes at higher frequencies. Contrary to the prior art, the lowest order mode employed in this invention exists in a region where only few modes are typically present. Therefore, it is much easier in such an environment to identify the changes and monitor the variation in materials using the lowest order mode. In addition, a non-dispersive region of the lowest mode may be selected for the modulus assessment.

This approach greatly reduces the need to use advanced tone burst equipment for a velocity measurement. Instead, a typical ultrasonic pulser/receiver is used for a velocity measurement. In addition, according to this invention, shear wave transducers may be positioned in a certain orientation in order to increase the sensitivity of detection. For example, shear wave transducers may be oriented so that their vibrations are parallel and aligned. In theory, the lowest symmetric mode in the low frequency region has a displacement/vibration direction of the ultrasound which is parallel to a specimen. This is difficult to do experimentally, but an efficient way was discovered to achieve it: by placing shear transducers on the same side of a specimen with the displacement/vibration direction parallel to the specimen and aligned (i.e., the displacement direction of each transducer is pointed to the other transducer and vice versa). Therefore, based on this unique transducer setup no additional signal conditioner or signal processing is needed, as is required in the prior art. The term "non-dispersive" means that the velocity is not dependent of frequency. This is important because most of the guided waves are dispersive. For guided waves of the lowest symmetric mode, there exists a region which is non-dispersive. This region is located at the low-frequency area (i.e., below 0.5 MHz*mm).

Regarding the generation and detection of guided waves with dry contact, this approach is made possible through a combination of transducers and a thin membrane as the couplant. In this manner ultrasound may be passed into a specimen without any liquid or gel ultrasonic couplant. This arrangement is different from traditional ultrasonic bulk wave or guided wave measurements which typically require ultrasonic gel or water immersion. The dry contact ultrasonic approach of this invention provides a significant advantage because the lack of a liquid ultrasonic couplant makes the collection of ultrasound data much faster, due to reduced setup time, and reduces the risk of contaminating the materials.

Based on this invention the in-plane modulus of a specimen may be monitored or determined using this same-side approach by monitoring the velocity of the guided ultrasonic wave generated in the sample, e.g. composite plate. The in-plane modulus relates to material states in the sample, and may be desirable at different stages of material processing, e.g. raw material, processed materials, manufactured materials, and performance testing both during processing and after manufacturing. To the best of our knowledge, current in-plane modulus testing is conducted by destructive mechanical testing.

The difficulty in controlling couplant contamination on composites in the prior art, and the lack of a practical dry-contact ultrasonic technique limits the nondestructive tests of specimens, e.g. composites. Currently, most in-plane modulus testing of composites is conducted mechanically with a tensile test machine. To prepare for a mechanical test, a tensile test specimen needs to be cut from the composite panel. Extensometers or strain gauges need to be installed on the specimen for a strain measurement. In addition, mechanical means are also required to determine a stress measurement for the in-plane modulus. However, specimens tested by mechanical means are no longer reusable for further material processing, and the time required for an in-plane modulus test is relatively long.

The same-side ultrasound approach may also be used to detect localized changes in materials. This is ability is also different from the prior art in which only an overall detection from one edge of the specimen to the opposite edge of the specimen can be made. The same-side ultrasound method has unique advantages over the edge-to-edge method in multiple cases, such as when inspecting a large panel with a large span of material between the two edges of the specimen, when there is only one side of the specimen which is accessible, or when the specimen has no accessible edges.

In summary, the method described in this invention is a same-side low frequency ultrasonic approach based on guided wave ultrasound technology. No liquid or gel couplant is needed during a measurement. Thin composites, with or without porosity, may be tested, and no residue of couplant remains on the composites after testing. Advantageously, the costs of testing are relatively low, particularly because the testing is not destructive, and the time required for test is short. To the best of our knowledge, similar methods have not been reported previously.

The applications for this invention are many fold: (a) modeling, (b) material processing, (c) mechanical performance, and (d) raw material screening. For modeling (a), the in-plane modulus estimated ultrasonically may provide critical input parameters needed for FEM (Finite Element Method) modeling. For material processing (b), the in-plane modulus estimated ultrasonically may provide important feedback on the degree of infiltration process which is needed to densify a composite during material processing. For mechanical performance (c), the in-plane modulus estimated ultrasonically may provide a modulus at a wide range of temperatures for mechanical performance assessment purposes. For raw material screening (d), the in-plane modulus estimated ultrasonically may provide the material states of those materials received for material processing. For example, the presence of porosity or thermal damage might reduce the values of apparent in-plane modulus.

In this method, the dry couplant ultrasonic guided measurement of in-plane modulus involves three major steps: (1) preparation of test setup, (2) test procedure and (3) applications.

FIG. 1 depicts the preparation of a test setup 10 which is a non-recurring step, and which contains the following components: a pair of low frequency shear wave ultrasonic transducers 12, 14 for the generation and detection of a guided wave in a thin composite panel 16 where one transducer may act as a transmitter and one transducer may act as a receiver; a membrane couplant 18, 20 between each transceiver 12, 14 and the panel 16, and which may be attached to each transducer; an assembly 22, 24 which holds each transducer 12, 14 and the associated membrane 18, 20 together; a transducer fixture 26 which holds each transducer assembly 22, 24 in a desired orientation; adjustable guides 28 on the transducer fixture 26 for skip distance and angle adjustments between the transducers 12, 14; an ultrasonic pulser-receiver 30 for the generation and detection of ultrasound; and a digital oscilloscope 34 which allows data acquisition of ultrasonic waveform on the display of the scope. Optionally, a preamp 32 may be attached between the ultrasonic pulser-receiver 30 and the transducers 12, 14.

Figure 2:
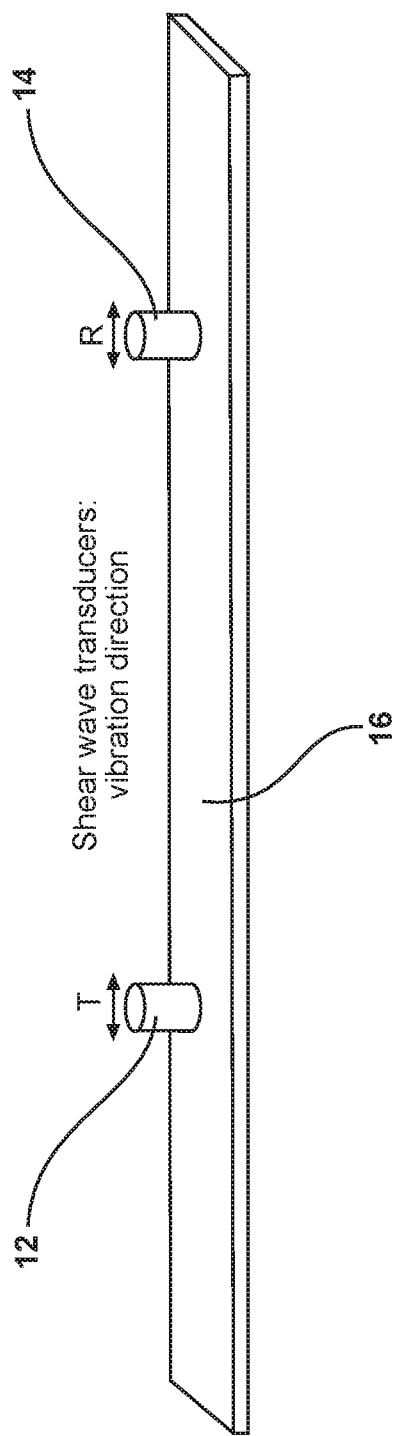
FIG. 2 depicts a pair of shear wave transducers on the same side of a planar specimen, according to the invention.
Figure 3:
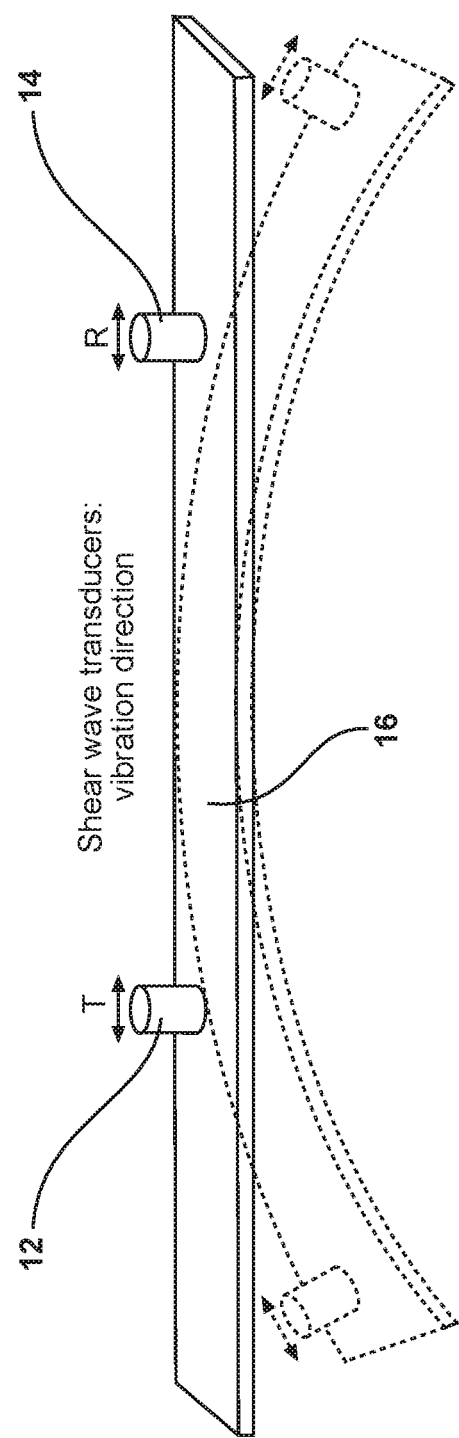
FIG. 3 depicts a pair of shear wave transducers on the same side of a curved specimen, according to the invention.

FIGS. 2-3 depict exemplary setups of transducers 12, 14, which may include a pair of 0.5" diameter 500 kHz shear wave transducers 12, 14 (e.g. Olympus V1554), sitting side by side with a fixed skip distance (50, 100, 150 or 200 mm), and which may be applied to the same side of a CMC composite panel using a custom fixture (see FIG. 1). This setup allows a localized area inspection on a large structure, whether the structure is planar (see FIG. 2) or curved (see FIG. 3). To maintain functionality in the low frequency region (e.g. at or below 0.5 MHz, the product of frequency (in MHz) and thickness of the composite (in mm) should be kept around or less than 0.5 MHz*mm. The measurement may be maintained in the principal direction of a composite (i.e., 0-deg or 90-deg or fiber direction of a cross-ply composite) in order to simplify calculations. The displacement or vibration direction of each transducer should point to the other transducer. In between the transducer and the membrane, i.e. dry couplant, an optional thin layer of honey or a viscous medium may be applied to enhance the transmission and reception of ultrasonic signals across the membrane 18, 20. No liquid or gel couplant is used between the specimen 16 and the membrane 18, 20, and no couplant is used against the surface of the specimen 16.

The representative setup, as depicted in FIGS. 1-3, has both transducers 12, 14 on the same side of a test specimen 16. T=transmitter; R=receiver. The specimen 16 may be kept under both transducer assemblies 22, 24 via a nominal weight applied on the transducer assemblies. A broadband ultrasonic pulser/receiver 30 (Olympus 5072PR) may be used for the generation and reception of ultrasonic signals. Amplification of the signals using a preamp 32 (Olympus ultrasonic preamp) is optional but not required. A digital oscilloscope 34 (Agilent 54622A, LeCroy 9350A or 24MXs-B) capable of acquiring waveforms may be used for the data acquisition of ultrasonic waveform on the display of the scope 34.

In a typical test procedure, a calibration procedure may be needed to be conducted first. This is different from traditional ultrasonic velocity measurements where signals of multiple reflections within a specimen are clearly defined or multiple specimens of different dimensions of identical compositions are available. The ultrasonic signal of interest in this guided wave measurement process is the first or the fastest signal, which may be followed by several other signals due to reverberation of ultrasound in the specimen. However, multiple reflections are often not clearly defined. An alternative process, as described in the following, is to calculate the initial starting time position of the ultrasonic signal.

Figure 4:
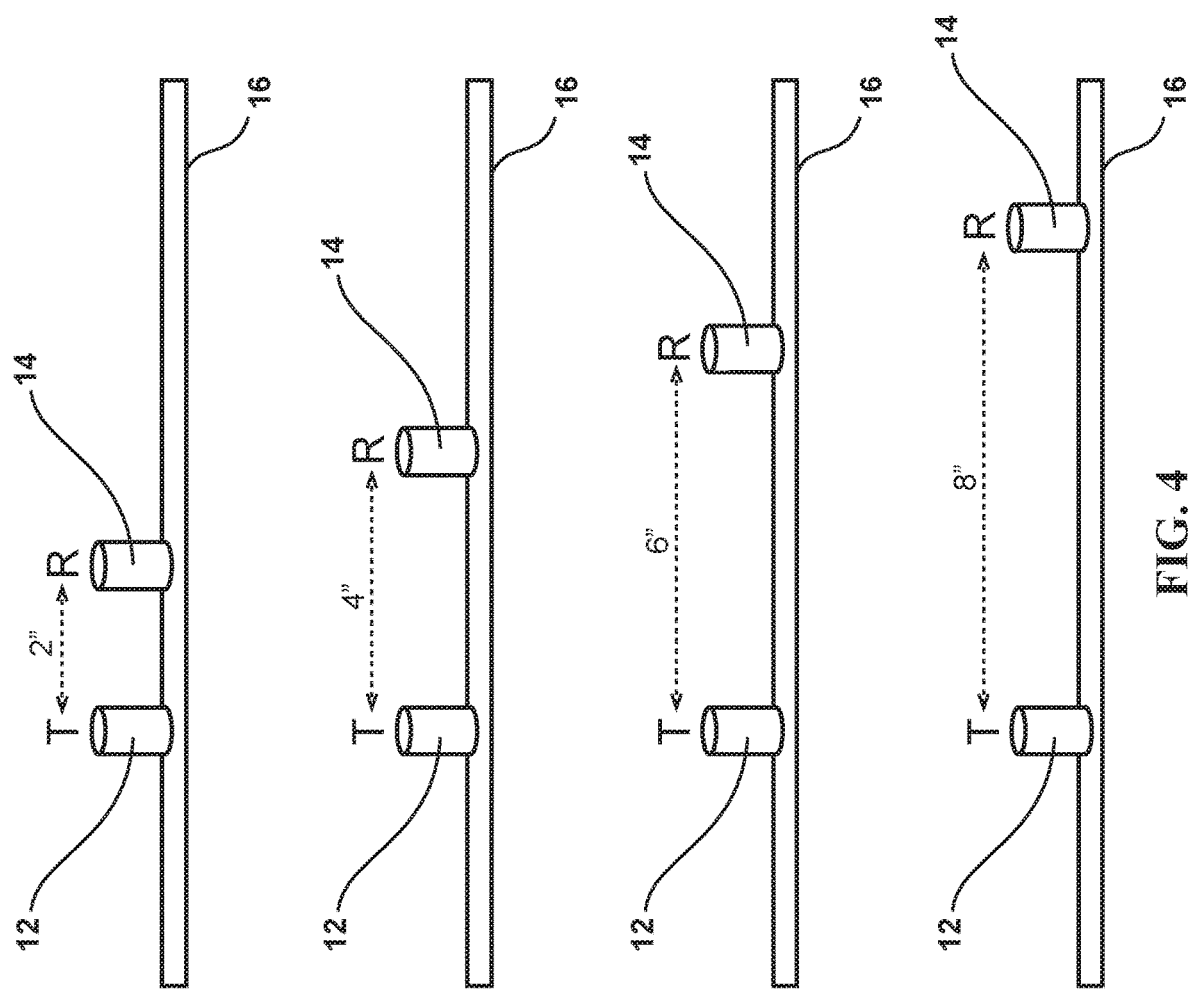
FIG. 4 depicts a pair of shear wave transducers with increasing skip-distance, according to the invention.
Figure 6:
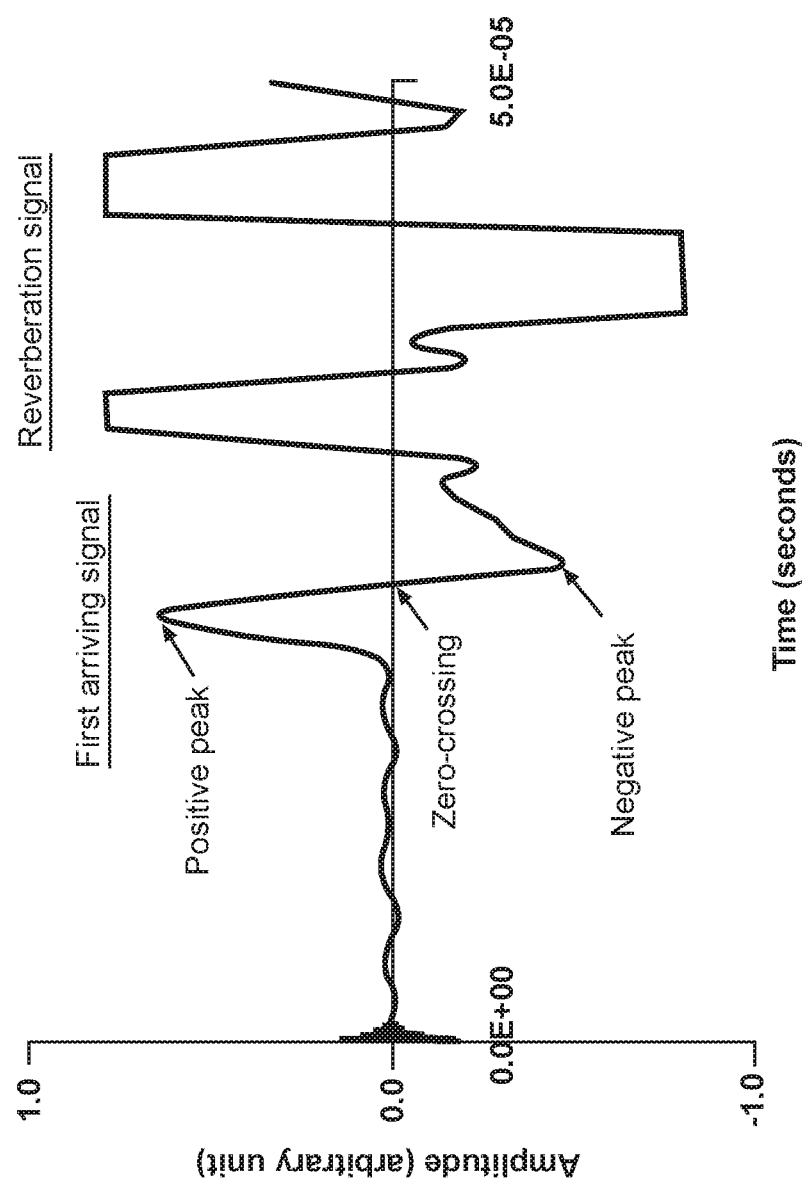
FIG. 6 illustrates the relationship between calibration dimensions and time of flight of an ultrasound waveform, according to the invention.

For a representative setup (see FIGS. 1-3), a calibration may be needed at the beginning of the test and is described as follows. This test starts with ultrasonic measurements on a known thin plate (e.g. 1 mm thick Al 7075-T6 and 60 mm wide 360 mm long). The calibration is performed on the plate by changing the skip distance (e.g. 50, 100, 150 or 200 mm or 2, 4, 6, 8 inches) between two transducer assemblies in the fixture (see FIG. 4). The ultrasonic signal of interest in this guided wave measurement is the first or the fastest signal, which may be followed by several other signals due to reverberation of ultrasound in the plate, as explained above, and as illustrated in FIG. 6. In each of the fastest-arriving signals (see FIG. 6), the arrival time at the zero-crossing prior to a peak is recorded. After finding the fastest-arriving signals (i.e., the earliest peak in a waveform), the zero-crossing next to a peak may be located by observing the switch of sign in amplitude (from negative to positive or positive to negative) and recording the arrival time of this position in the waveform. This zero-crossing approach provides better time definition or time resolution than when using the peak of the signal. This is because, when expanded in the time domain, the peak signal is usually spread out in a plateau and does not yield a sharp arrival time as it does with in zero-crossing.

Figure 5:
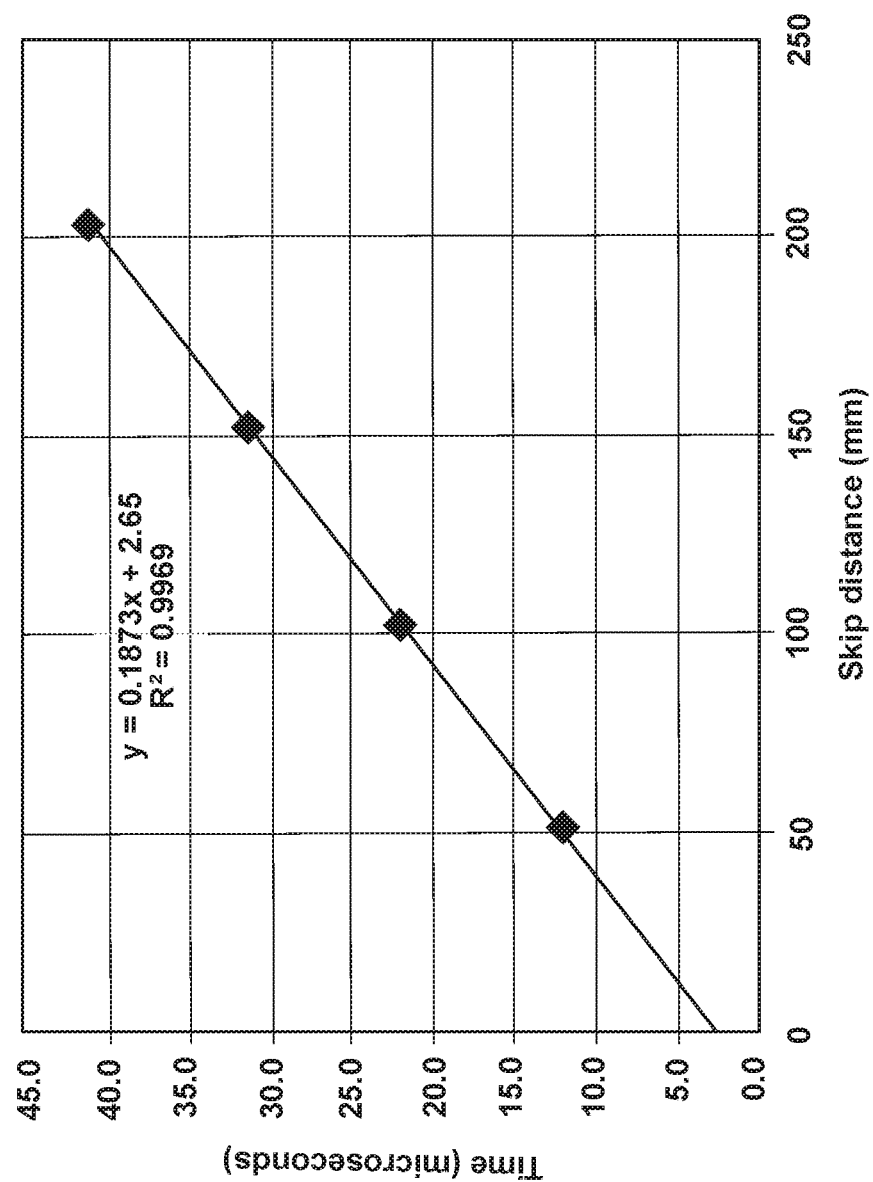
FIG. 5 illustrates the relationship between skip-distance and time of flight of an ultrasound waveform, according to the invention.

After acquiring the waveforms for each length, record the arrival time of the zero-crossing before the peak. A plot of the length is made with the arrival time of the zero-crossing arrival time of the signal. Afterwards, a linear best fit is to be made based on the data acquired (see FIG. 5). The intercept of the best fit line on the time axis may not be at the origin of the plot. This is because each transducer may have a wear plate in front of the transducer which may delay the initial signal and multiple reflections within the thin plate may smear the initial signal, i.e. the "main bang" signal. This signal may be further delayed by the presence of the membranes 18, 20, and this may make the estimate of the initial starting time difficult. Therefore, in the specimen test, as described in the following, this intercept may be subtracted out of the zero-crossing from the first arrival signal. By using this intercept method, the time-of-flight in a specimen without multiple specimens or reflections is estimated. FIG. 5 explains that $y=0.1873x+2.65$; and $R^2=0.9969$. This is a linear best-fit of the data, which is also known as a linear trendline. The formula shown on FIG. 5 represents a line (i.e., $y=mx+b$, with m as the slope, and b as the intercept at the y-axis). The intercept is defined as the starting point of the ultrasonic signal from one end of the specimen (i.e., 2.65 microseconds). Therefore, one signal is needed to estimate the time-of-flight or velocity of ultrasound in a specimen. This is a unique approach. Others are using multiple specimens of different lengths or multiple reflections within a single specimen to calculate the velocity. In the present invention, by using this intercept approach, only one signal in one specimen is needed to evaluate the velocity.

In a typical test procedure, the next step may be a specimen test. During the specimen test, the same zero-crossing prior to a peak (like that in the calibration process) should be recorded. The distance between two transducer assemblies can be measured with a pair of calipers. To prevent a skew or distortion of the ultrasonic signal, the measurement should be conducted in the principal direction of a composite, which is determined by the primary direction (s) of the fibers in the composite. For example, the direction should be either along or across the fibers or [0°] or [90°] but not in between such as [45°]. For a [0°/90°] composite, measurement in both orientations is usually made. The arrival time of each orientation may be recorded along with the length of each orientation.

In a typical test procedure, the third step may be a calculation (using the equation below, for example) of the in-plane modulus. For an in-plane modulus evaluation, the Poisson's ratio and the density of the material are also needed. The Poisson's ratio could be acquired by a separate test using mechanical means. For a CMC (ceramic matrix composite) sample with a smaller Poisson's ratio (e.g. 0.2), it was noticed that the effect of the Poisson's ratio may not be significant. For example, an increase of the Poisson's ratio by 100% in the calculation might result in a 4% decrease (or 9 GPa reduction) of the in-plane modulus for a typical CMC material. For testing of a material in a rod form, the Poisson's ratio term may be taken out from the equation for the calculation of in-plane modulus. Unlike Poisson's ratio, the density has a significant effect on the modulus estimate. A correct density is important for the modulus evaluation. Furthermore, if the modulus of a composite panel is known, this invention can also be used to evaluate the local density variation in the panel.

$$E = \rho V^i (1 - v^i)$$

where
$\rho$ density of material
V ultrasonic velocity
E in-plane modulus
$v$ Poisson's ratio As stated above, the applications for this invention are many fold: (a) modeling, (b) material processing, (c) mechanical performance, (d) raw material screen, and (e) for flexible materials.

For modeling, the in-plane modulus estimated ultrasonically may provide critical input parameters needed for FEM (Finite Element Method) modeling. For material processing, the in-plane modulus estimated ultrasonically may provide important feedback on the degree of infiltration process which may be needed to densify a composite during material processing. For a mechanical process, the in-plane modulus estimated ultrasonically may provide a modulus at a temperature for mechanical performance assessment purposes. For raw material screening, the in-plane modulus estimated ultrasonically may provide information regarding the material states for the material received for material processing. For example, the presence of porosity or after a thermal damage may reduce the values of apparent in-plane modulus.

Figure 7:
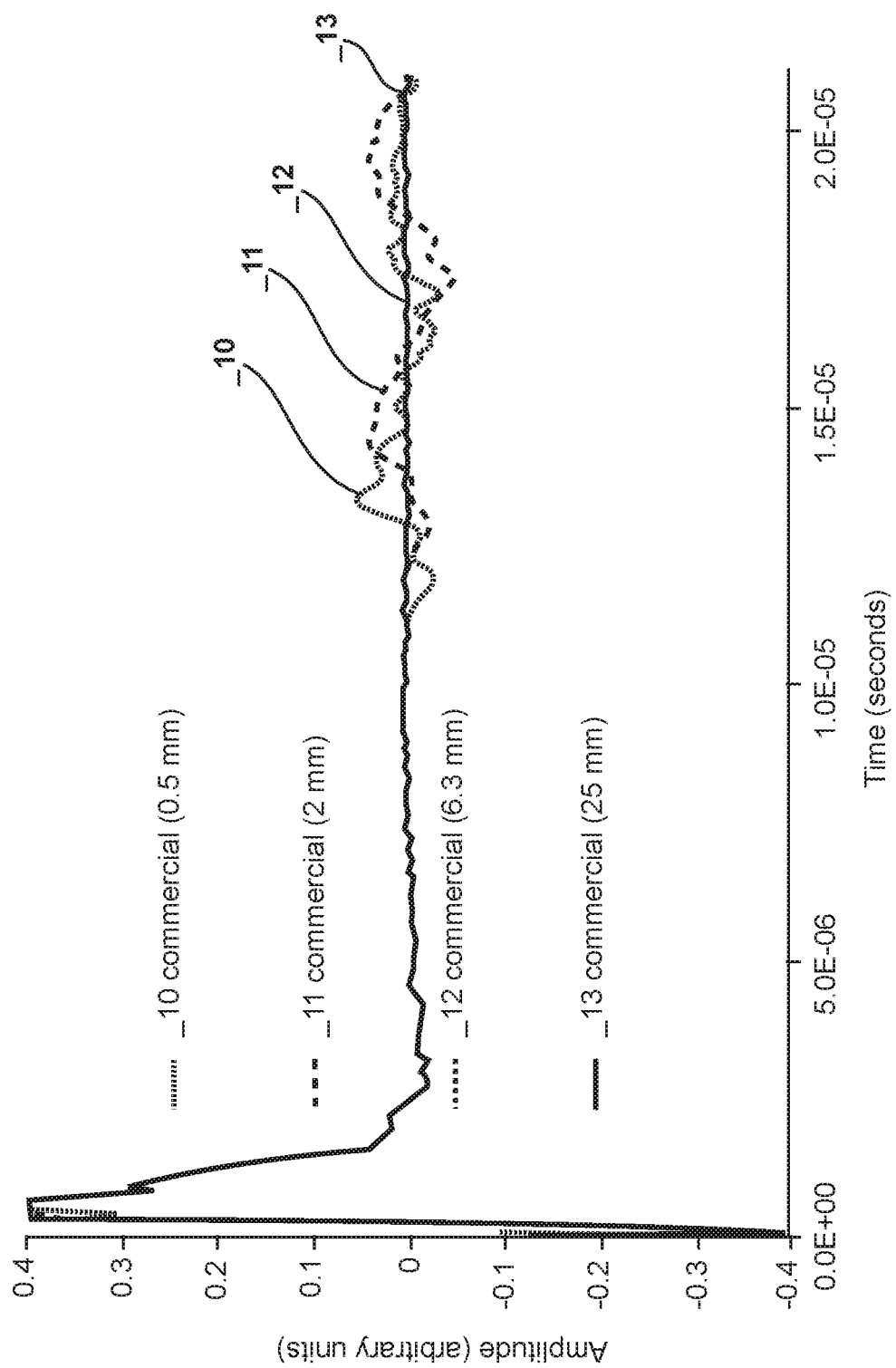
FIG. 7 illustrates ultrasonic signal sensitivity of commercially available NDE membrane materials, according to the present invention, according to the invention.
Figure 8:
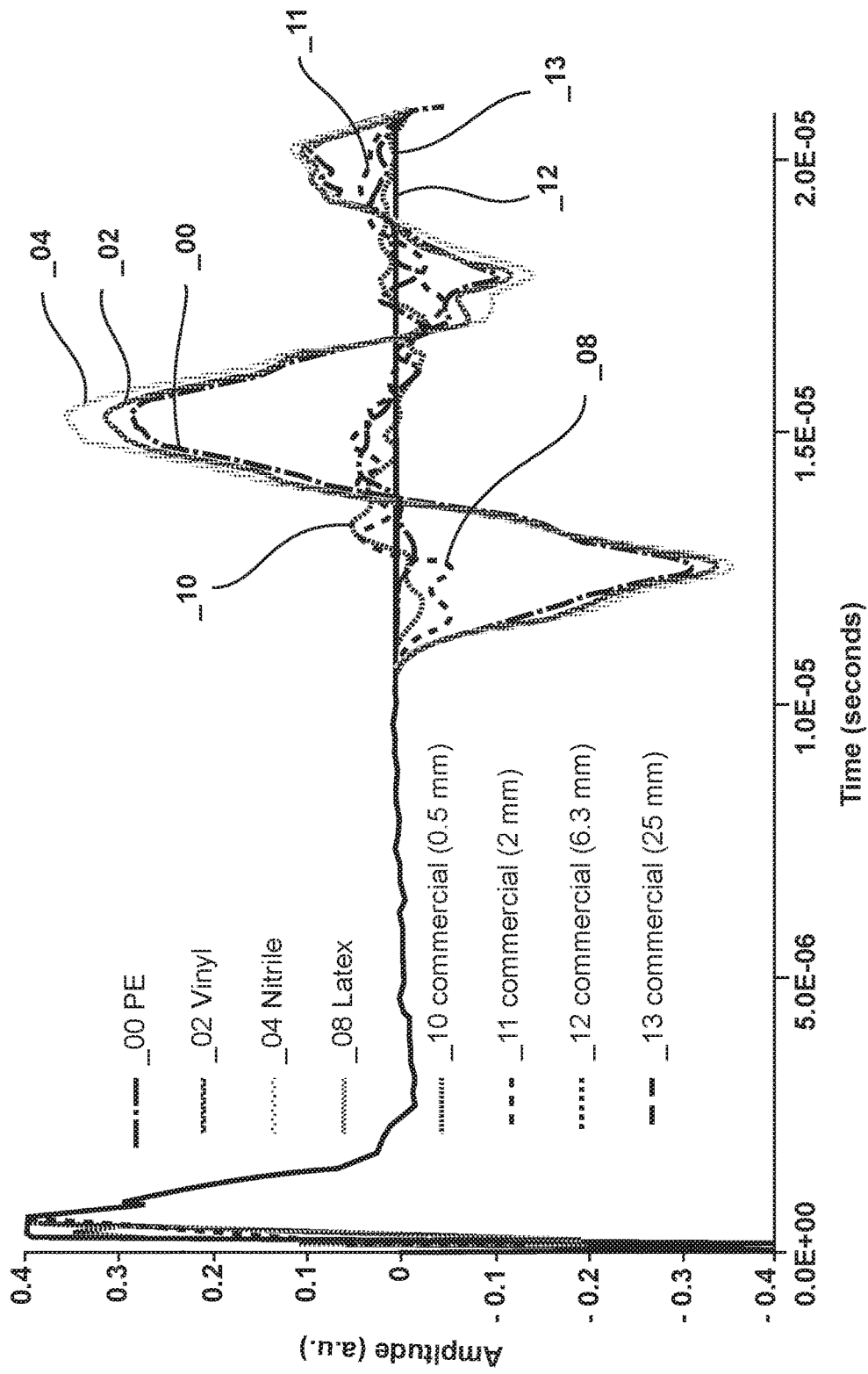
FIG. 8 illustrates ultrasonic signal sensitivity of nitrile, vinyl, and polyester (PE), according to the present invention, according to the invention.
Figure 9:
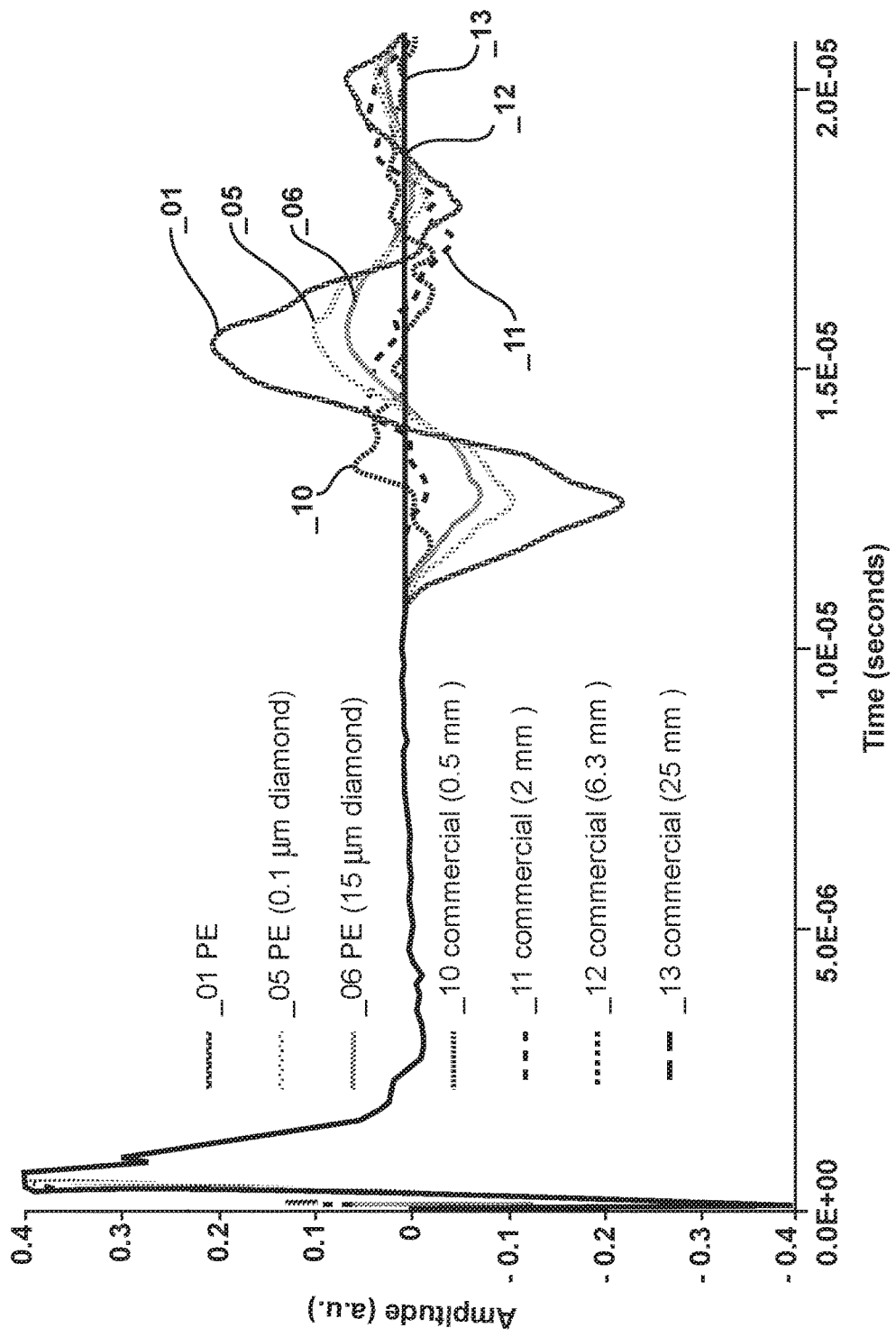
FIG. 9 illustrates ultrasonic signal sensitivity of PE with 0.1 micron diamond particles and PE with 15 micron diamond particles, according to the invention.
Figure 10:
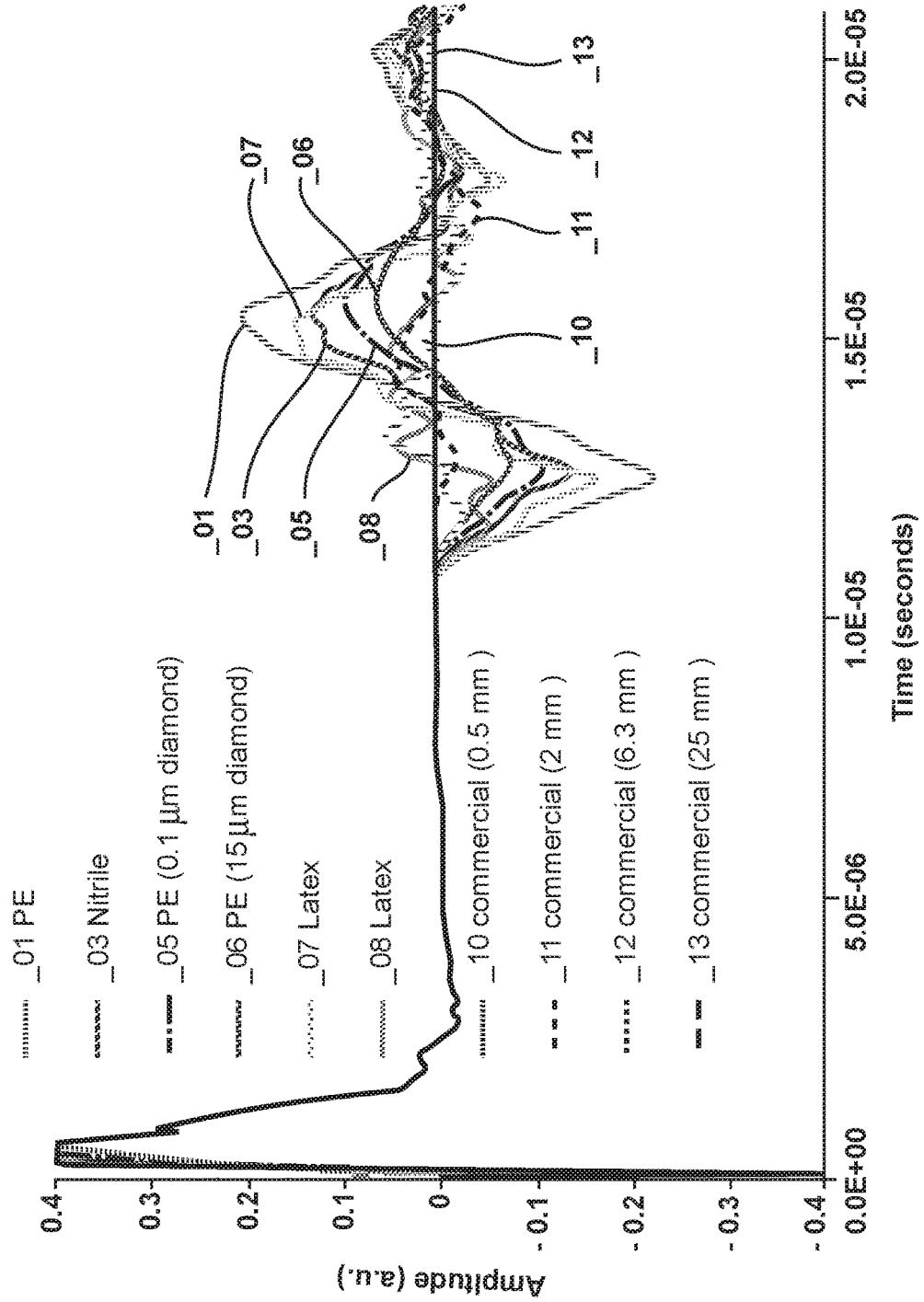
FIG. 10 illustrates ultrasonic signal sensitivity of latex, according to the invention.
Figure 11:
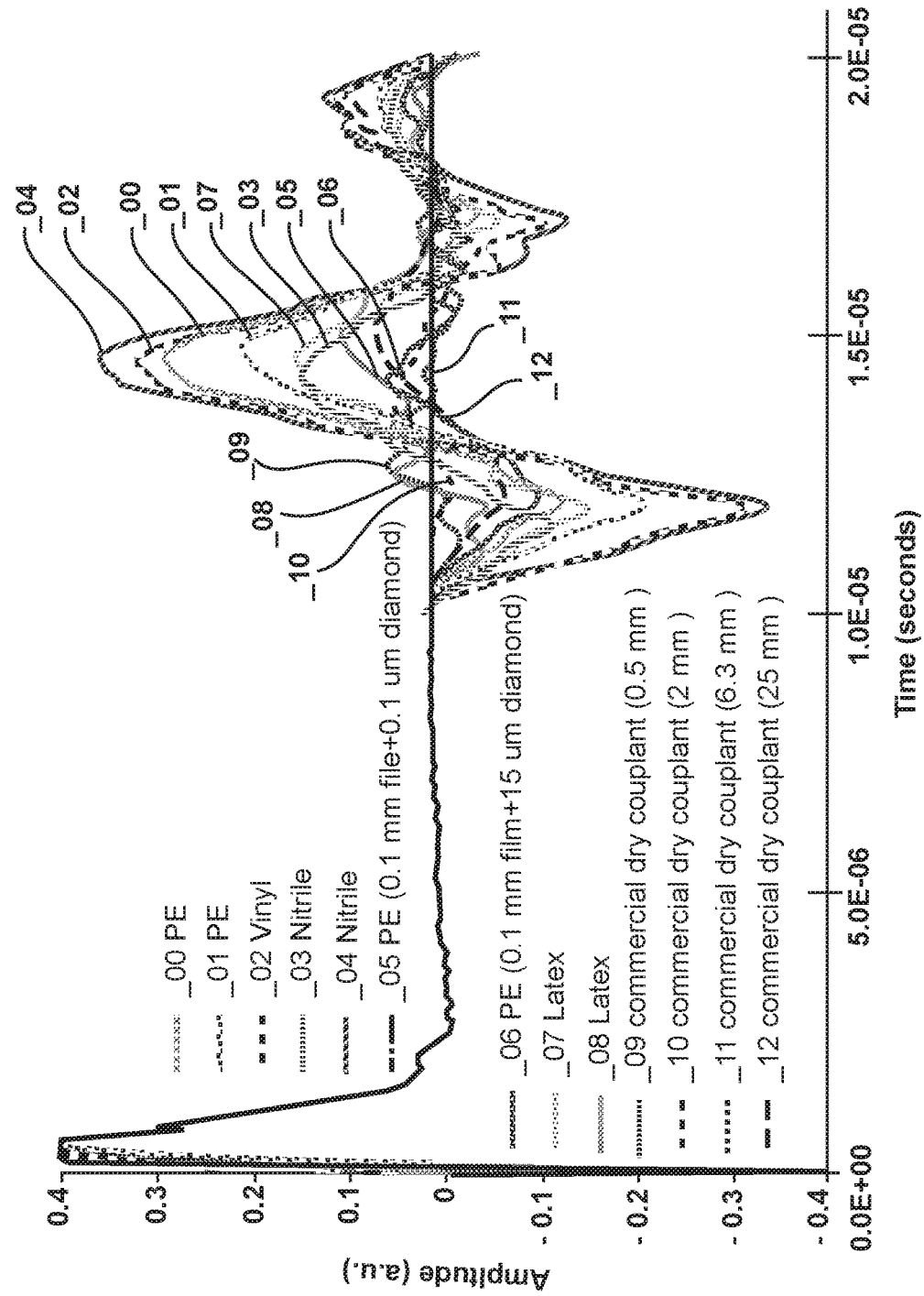
FIG. 11 illustrates ultrasonic signal sensitivity of commercially-available membrane materials, nitrile, vinyl, polyester, polyester with diamond particles, and latex, according to the invention.

FIGS. 7-11 illustrate the effect of particular membrane materials on the ultrasonic signal sensitivity, according to the disclosed invention and method. During the course of invention development, membrane materials with superior ultrasonic signal sensitivity were identified and the effects of their thickness observed. Based on signal sensitivity, four groups were examined (1) commercially available NDE membrane materials obtained from Olympus (FIG. 7); (2) nitrile, vinyl, and polyester (PE) (FIG. 8); (3) PE with 0.1 micron diamond particles and PE with 15 micron diamond particles (FIG. 9); (4) latex (FIG. 10). The signals were observed to decrease as the thickness increased. The results are compiled in FIG. 11, which shows that nitrile, vinyl, and polyester have significantly better sensitivity than commercially available membranes.

As is illustrated in FIG. 7, the commercially-available membranes are not nearly sensitive enough to couple ultrasonic energy into a specimen. The thick commercial membranes have an impedance similar to water and have a unique composition. On the other hand (FIGS. 8-10), polyethylene, vinyl, and nitrile membrane materials are optimal or preferable for use according to the present disclosure. In particular polyethylene membranes having a thickness of 0.05 mm to 0.15 mm, or vinyl membranes having a thickness of 0.05 mm to 0.15 mm, or nitrile membranes having a thickness of 0.05 mm to 0.15 mm. Although the thickness of these membranes may have some effect on the transmission of ultrasound therethrough, the material of the membrane also plays a part affecting the transmission of ultrasound through it. This is because the thickness of each of these membranes is relatively small as compared to the ultrasound wavelength (i.e., around 10 mm) through each membrane. For example, latex-type membranes produce much worse signals than do the nitrile-type of membranes. The material properties of the membrane, e.g. the modulus of elasticity and density, play a major role affecting the transmission of ultrasound through the membrane between a transducer and a specimen. In addition, the surface roughness or texture, caused by addition of diamond particles on PE membrane, may also affect the transmission of ultrasound through the membrane.

Below are four claims in this invention disclosure:

1. The determination of the in-plane modulus of a thin specimen by a same-side ultrasonic approach based on the lowest symmetric mode of a low frequency guided wave is new. An innovative contact approach based on extremely low frequency transducers in a pitch-and-catch mode on the same side of a specimen was invented to ensure that the modulus measurement stays in the low frequency asymptote region of the lowest symmetric mode for an in-plane modulus evaluation on a thin specimen. Furthermore, to avoid possible skewness of ultrasound, the measurement may need to be in the principal direction of the material if it is anisotropic. Following these guidelines, the in-plane modulus determined by the disclosed method and apparatus has shown favorable agreement with results previously established by mechanical means.

2. The use of a shear wave contact method on the same side of a thin specimen to induce the lowest symmetric mode of a Lamb wave is a new concept. Experimentally, most of the prior art guided wave studies have been done by the immersion method. However, immersing a sample into water creates a drawback for materials with pores (e.g., CMCs and foams) because of possible contamination concerns. The use of a shear wave contact method as described in this invention to induce the lowest symmetric mode of a guided wave on the same side of a thin specimen is an innovative approach. To the best of our knowledge, similar methods have not been reported previously. Prior art approaches based on a "mediator probe" can only generate surface or Rayleigh waves. Likewise, prior art using a longitudinal transducer with or without wedges are good only for generating shear waves or the lowest antisymmetric mode guided waves, but not the lowest symmetric mode. Consequently, the guided wave generated according to this invention has shown uniqueness in the generation and reception of the lowest symmetric mode guided waves which are needed for the in-plane modulus evaluation.

3. Localized variation detection in a large structure using of a shear wave contact method on the same side of a thin specimen based the lowest symmetric mode of guided wave is a new concept. Prior art based on the edge-to-edge approach allow only the detection the material variation in the area between the edges of the specimen. For a large structure, this approach only gives an overall change between two transducers separated by a large distance dictated by the dimension of the specimen. As the edge of the specimen is not accessible or when the local variation is required, this same-side method can provide better localized modulus or density variation detection in materials than the edge-to-edge approach. This is because the experimental setup of the same-side approach allows an adjustable separation between two transducers using the custom fixture in this invention and not dependent upon the size of the specimen inspected. In addition, this same-side method may also be used in a curved structure for the detection of small variations in the curvature area. Furthermore, if the modulus of a composite panel is known, this invention can also be used to evaluate the local density variation in the panel.

4. The use of a calibration method to locate the starting point in time domain based on the lowest symmetric mode of a guided wave is a new concept. This concept provides a precision step to identify the starting point in the main bang of a pulse train of ultrasound signals. While multiple modes of guided waves could exit and interact with other, the only reliable signal is the early arrival signal from the lowest symmetric mode of a guided wave. With only one signal, it is difficult to evaluate the velocity needed for a modulus evaluation. Although the main bang of the pulse train, in which the starting signal is buried, may serve as a rough estimate of the starting signal. A better method is the use of the calibration method as described in this invention disclosure. This method is a key step for a reliable in-plane modulus estimate. This method is different from the prior art which requires multiple echoes from a specimen or specimens of different dimensions for a velocity measurement.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. An apparatus for performing nondestructive evaluation of a specimen comprises:
   a first ultrasonic shear wave transducer configured to be coupled to a first side of a specimen to be tested;
   a second ultrasonic shear wave transducer configured to be coupled to the first side of the specimen at a predetermined distance from the first ultrasonic shear wave transducer;
   a dry couplant between the first and second ultrasonic shear wave transducers and the specimen, wherein the first ultrasonic shear wave transducer is configured to transmit a guided wave into the specimen, and the second ultrasonic shear wave transducer is configured to receive the guided wave from the first ultrasonic shear wave transducer, wherein the first ultrasonic shear wave transducer and the second ultrasonic shear wave transducer are low frequency shear wave transducers that are configured to be operated at or below 0.5 MHz (500 kHz), wherein displacement vibration of the first ultrasonic shear wave transducer and the second ultrasonic shear wave transducer are pointed toward each other, wherein the product of the ultrasound frequency in MHz and thickness of the specimen is about or less than 0.5 MHz*mm.

2. The apparatus for performing nondestructive evaluation of a specimen of claim 1, wherein the specimen has a planar surface such that the first and second ultrasonic shear wave transducers operate in the same plane.

3. The apparatus for performing nondestructive evaluation of a specimen of claim 1, wherein the specimen has a curved surface such that the first and second ultrasonic shear wave transducers operate in different planes.

4. The apparatus for performing nondestructive evaluation of a specimen of claim 1, wherein the dry couplant comprises a membrane between the first and second ultrasonic shear wave transducers and the specimen.

5. The apparatus for performing nondestructive evaluation of a specimen of claim 4, wherein the dry couplant is a nitrile rubber vinyl, or polyester membrane.

6. A method for performing nondestructive evaluation of a specimen comprises:
   coupling a first ultrasonic shear wave transducer to a first side of a specimen to be tested;
   coupling a second ultrasonic shear wave transducer to the first side of the specimen at a predetermined distance from the first ultrasonic shear wave transducer;
   orienting the first ultrasonic shear wave transducer and the second ultrasonic shear wave transducer so that each transducer's displacement vibration is pointed toward the other transducer;
   placing a dry couplant between the first and second ultrasonic shear wave transducers and the specimen;
   operating the first ultrasonic shear wave transducer and the second ultrasonic shear wave transducer at or below 0.5 MHz (500 kHz), wherein the product of the ultrasound frequency in MHz and thickness of the specimen is about or less than 0.5 MHz*mm;
   transmitting a guided wave from the first ultrasonic shear wave transducer into the specimen; and
   receiving the guided wave by the second ultrasonic shear wave transducer.

7. The method for performing nondestructive evaluation of a specimen of claim 6, further comprising:
   operating the first and second ultrasonic shear wave transducers in the same plane on the first side of the specimen.

8. The method for performing nondestructive evaluation of a specimen of claim 6, further comprising:
   operating the first and second ultrasonic shear wave transducers in different planes on the first side of the specimen.

9. The method for performing nondestructive evaluation of a specimen of claim 6, wherein the dry couplant comprises a membrane between the first and second ultrasonic shear wave transducers and the specimen.

10. The method for performing nondestructive evaluation of a specimen of claim 9, wherein the dry couplant comprises a nitrile rubber, vinyl, or polyester membrane between the first and second ultrasonic shear wave transducers and the specimen.

11. The method for performing nondestructive evaluation of a specimen of claim 6, further comprising:

determining the velocity of an ultrasonic signal in the specimen from a single signal.

\* \* \* \* \*